(12) United States Patent
Willassen (10) Patent No.: US 8,300,123 B2
(45) Date of Patent: Oct. 30, 2012

(54) IMAGER COLUMN-LEVEL AMPLIFIER WITH PIXEL-WISE AUTOMATIC GAIN SELECTION

(75) Inventor: Trygve Willassen, Oppegaard (NO)

(73) Assignee: Aptina Imaging Corporation, George Town (KY)

( * ) Notice: Subject to any disclaimer, the term of this patent is extended or adjusted under 35 U.S.C. 154(b) by 1049 days.

(21) Appl. No.: 12/252,646

(22) Filed: Oct. 16, 2008

(65) Prior Publication Data

US 2010/0097371 A1 Apr. 22, 2010

(51) Int. Cl.
*H04N 5/217* (2006.01)
*H04N 5/20* (2006.01)
(52) U.S. Cl. ........................ 348/255; 348/241
(58) Field of Classification Search .................. 348/241, 348/242, 243, 245, 255, 296, 308
See application file for complete search history.

(56) References Cited

U.S. PATENT DOCUMENTS

| | | | |
|---|---|---|---|
| 6,747,264 B2 | 6/2004 | Miida | |
| 6,757,018 B1 | 6/2004 | Fowler | |
| 7,005,628 B2 | 2/2006 | Rossi | |
| 7,443,435 B2 * | 10/2008 | Loose | 348/294 |
| 2004/0080637 A1 | 4/2004 | Nakamura et al. | |
| 2005/0259167 A1 | 11/2005 | Inoue et al. | |

FOREIGN PATENT DOCUMENTS

WO  WO 2006/017042 A2  2/2006

* cited by examiner

*Primary Examiner* — Timothy J Henn (57) ABSTRACT

An imager architecture that utilizes column sampling circuitry that can support pixel-wise automatic gain selection (AGS). The column sampling circuitry samples the pixel output signals directly (e.g., with unity gain) or after amplification in a column level amplifier while supporting correlated double sampling (CDS) in both situations.

20 Claims, 6 Drawing Sheets

Column circuit supporting automatic gain selection (AGS)

IMAGER COLUMN-LEVEL AMPLIFIER WITH PIXEL-WISE AUTOMATIC GAIN SELECTION

FIELD OF THE INVENTION

Embodiments of the invention relate to imagers and more particularly to imagers having column-level amplifiers with pixel-wise automatic gain selection.

BACKGROUND

A CMOS imager circuit includes a focal plane array of pixel circuits, each one of the pixels including a photosensor, for example, a photogate, photoconductor or a photodiode overlying a substrate for accumulating photo-generated charge in the underlying portion of the substrate. Each pixel has a readout circuit that can include an output field effect transistor and a charge storage region connected to the gate of an output transistor. The charge storage region may be constructed as a floating diffusion region. Each pixel may include at least one electronic device such as a transistor for transferring charge from the photosensor to the storage region and one device, also typically a transistor, for resetting the storage region to a predetermined charge level.

In a CMOS imager, the active elements of a pixel circuit perform the necessary functions of: (1) photon to charge conversion; (2) accumulation of image charge; (3) resetting the storage region to a known state; (4) transfer of charge to the storage region accompanied by charge amplification; (5) selection of a pixel for readout; and (6) output and amplification of a signal representing pixel charge. Photo charge may be amplified when it moves from the initial charge accumulation region to the storage region. The charge at the storage region is typically converted to a pixel output voltage by a source follower output transistor.

CMOS imagers of the type discussed above are generally known as discussed, for example, in U.S. Pat. No. 6,140,630, U.S. Pat. No. 6,376,868, U.S. Pat. No. 6,310,366, U.S. Pat. No. 6,326,652, U.S. Pat. No. 6,204,524 and U.S. Pat. No. 6,333,205, assigned to Micron Technology, Inc.

Figure 1:
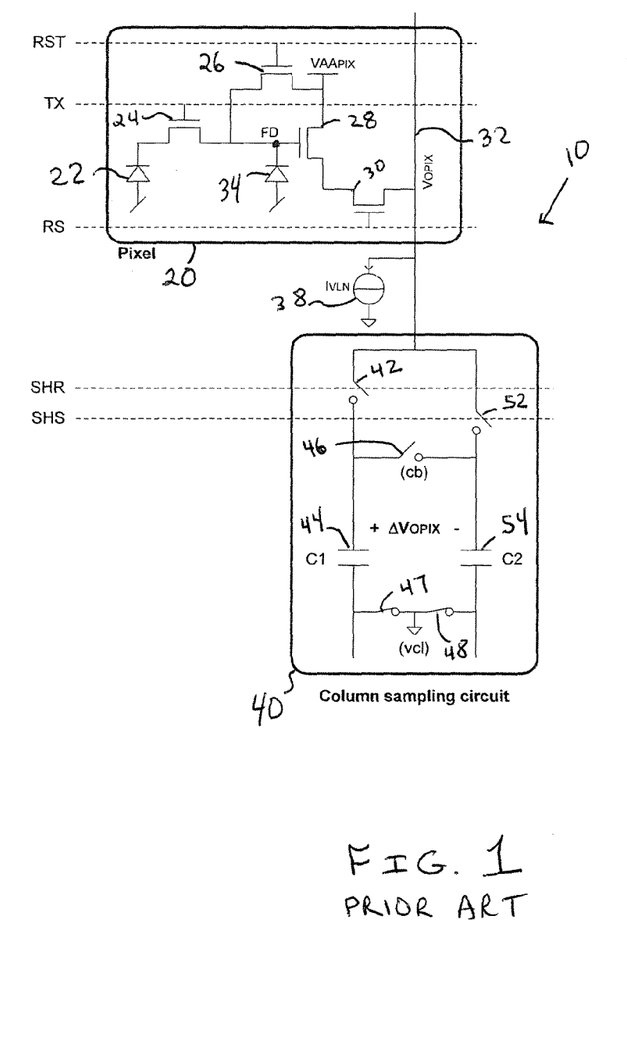
FIG. 1 illustrates a portion of a conventional imager.

FIG. 1 illustrates a portion of a conventional CMOS imager 10. The illustrated imager 10 includes a pixel 20, one of many that are in a pixel array (not shown), connected to a column sample and hold circuit 40 via a pixel output line 32. The illustrated pixel 20 includes a photosensor 22 (illustrated as a photodiode for example purposes only), transfer transistor 24, floating diffusion region FD (illustrated as a photodiode 34 for example purposes only), reset transistor 26, source follower transistor 28 and row select transistor 30. The photosensor 22 is connected to the floating diffusion region FD by the transfer transistor 24 when the transfer transistor 24 is activated by a transfer control signal TX. The reset transistor 26 is connected between the floating diffusion region FD and an array pixel supply voltage VAApix. A reset control signal RST is used to activate the reset transistor 26, which resets the floating diffusion region FD (as is known in the art).

The source follower transistor 28 has its gate connected to the floating diffusion region FD and is connected between the array pixel supply voltage VAApix and the row select transistor 30. The source follower transistor 28 converts the stored charge at the floating diffusion region FD into an electrical output voltage signal $V_{OPIX}$. The row select transistor 30 is controllable by a row select signal RS for selectively connecting the source follower transistor 28 and its output voltage signal $V_{OPIX}$ to the pixel output line 32.

A constant current source 38 provides a biasing current $I_{VLN}$ that is used to bias the pixel output line 32. The constant current source 38 is shared for all pixels 20 on the same column in the pixel array. Within the column sample and hold circuit 40, the pixel output line 32 is connected to a first capacitor 44 (having a first capacitance C1) thru a sample and hold reset signal switch 42. The sample and hold reset signal switch 42 is controlled by a sample and hold reset control signal SHR. The pixel output line 32 is connected to a second capacitor 54 (having a second capacitance C2) thru a sample and hold pixel signal switch 52. The sample and hold pixel signal switch 52 is controlled by a sample and hold pixel control signal SHS. The switches 42, 52 are typically MOSFET transistors.

The second terminal of the first capacitor 44 is connected to a clamping voltage vcl via a first clamping switch 47. The second terminal of the second capacitor 54 is also connected to the clamping voltage vcl by a second clamping switch 48. The clamping voltage vcl is used to place a charge on the two capacitors 44, 54 when it is desired to store reset and pixel signals, respectively (when the appropriate switches 47, 48 are closed by a control signal (not shown) and the appropriate sample and hold control signals SHR, SHS are generated). A crowbar switch 46 is used to read out the signals stored in the capacitors 44, 54 (when a crowbar signal cb is generated to close the switch 46).

Figure 2:
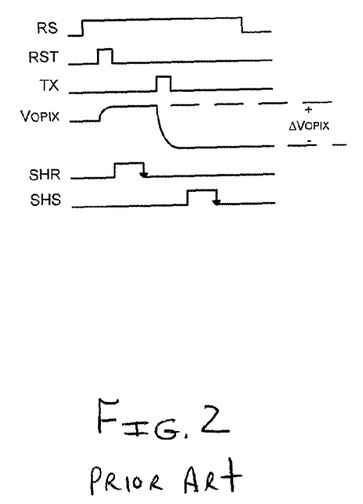
FIG. 2 illustrates a sample timing diagram of the operation of the FIG. 1 imager.

Referring to FIGS. 1 and 2, the operation of the imager 10 is now described. In operation, the source follower transistor 28 acts as a buffer for the voltage on the floating diffusion region FD and drives the pixel output voltage signal $V_{OPIX}$ onto line 32 when the row select control signal RS is asserted. The pixel readout operation is initiated when the reset control signal RST is pulsed, which activates the reset transistor 26 and resets the floating diffusion region FD to the array pixel supply voltage VAApix. Then, the pixel output voltage signal $V_{OPIX}$ (i.e., reset level) is sampled and stored on the first capacitor 44 at the falling edge of the SHR pulse.

Next, the transfer transistor control signal TX is pulsed to transfer any charge accumulated in the photosensor 22 to the floating diffusion region FD. This will result in a voltage step on the floating diffusion region FD, where the size of the step depends on the conversion gain of the floating diffusion region FD. When the charge transfer is complete, the transfer transistor control signal TX is de-asserted and the pixel output voltage signal $V_{OPIX}$ is sampled to store the pixel signal level on the second capacitor 54 at the falling edge of the SHS pulse. For further processing, the net signal level from the pixel is interpreted as the voltage difference on the capacitors 44, 54, which is shown as $\Delta V_{OPIX}$ in FIGS. 1 and 2. A new integration period can be started by resetting the photosensor 22 by asserting the transfer transistor control signal TX and the reset control signal RST simultaneously; the resetting of the photosensor 22 is then followed by the accumulation of charge in the photosensor 22 (once the transfer transistor control signal TX is de-asserted).

Figure 3:
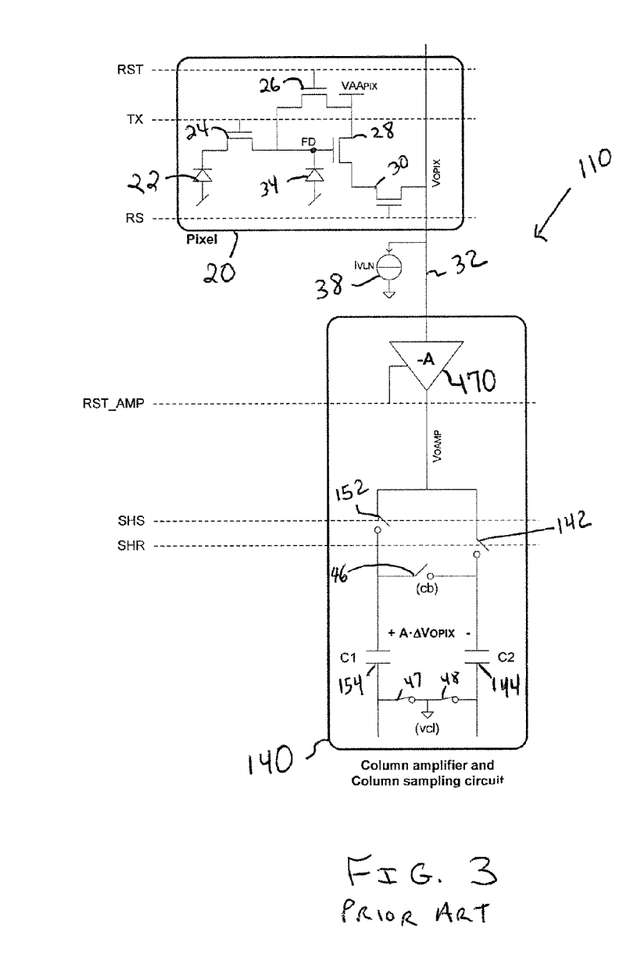
FIG. 3 illustrates a portion of a conventional imager utilizing a column level amplifier in column sampling circuitry.

FIG. 3 illustrates a portion of another conventional CMOS imager 110. The illustrated portion of the imager 110 includes a pixel circuit 20 connected to a column amplifier and sample and hold circuit 140 via a pixel output line 32. A constant current source 38 provides a biasing current $I_{VLN}$ that is used to bias the pixel output line 32. The column amplifier and sample and hold circuit 140 includes a column level amplifier 170, a first capacitor 154 (having a first capacitance C1), a second capacitor 144 (having a second capacitance C2), a sample and hold reset signal switch 142 (controlled by a sample and hold reset control signal SHR), a sample and hold pixel signal switch 152 (controlled by a sample and hold pixel control signal SHS), first and second clamping switches 47, 48 and a crowbar switch 46 (controlled by a crowbar signal cb).

Figure 4:
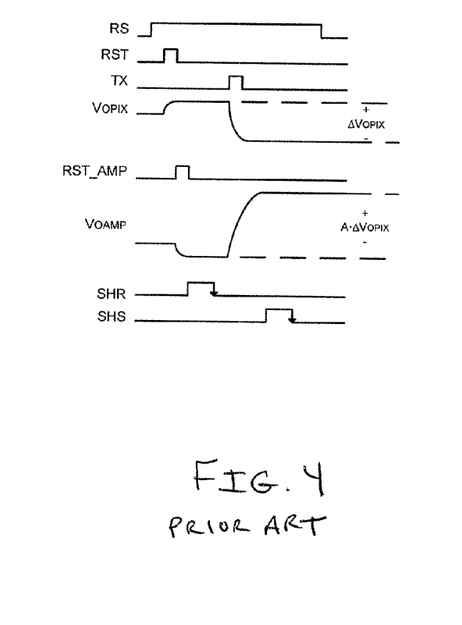
FIG. 4 illustrates a sample timing diagram of the operation of the FIG. 3 imager.

The amplifier 170 is connected between the pixel output line 32 (to receive and amplify the pixel output signal $V_{OPIX}$) and the remaining sampling circuitry to reduce the total noise referenced to the pixel output. FIG. 4 illustrates a timing diagram for the portion of the imager 110, when the amplifier 170 is an inverting voltage amplifier. Referring to FIGS. 3 and 4, the operation of the imager 110 is now described. The row select control signal RS is set high to activate the row select transistor 30. The pixel readout operation is initiated when the reset control signal RST is pulsed, which activates the reset transistor 26 and resets the floating diffusion region FD to the array pixel supply voltage VAApix. The column level amplifier 170 is reset (by the pulsing of the reset amplifier control signal RST_AMP) after the floating diffusion region FD has been reset and the reset level of the amplifier 170 (referred to herein as $V_{OAMP\_RST}$) is sampled onto the second capacitor 144 via switch 142 at the falling edge of the SHR pulse.

Next, the transfer transistor control signal TX is pulsed to transfer any charge accumulated in the photosensor 22 to the floating diffusion region FD. This will result in a voltage step on the floating diffusion region FD, where the size of the step depends on the conversion gain of the floating diffusion region FD. When the charge transfer is complete, the transfer transistor control signal TX is de-asserted. When the amplifier output $V_{OAMP}$ (i.e., the amplified pixel signal level) has stabilized, the amplifier output $V_{OAMP}$ is sampled onto the first capacitor 154 via switch 152 at the falling edge of the SHS pulse. Since the column amplifier 170 has voltage gain of −A, the net signal level, interpreted as the voltage difference between the first and second capacitors 154, 144, translates to $A \cdot \Delta V_{OPIX}$.

The imager 110 works well when the pixel output voltage signal $V_{OPIX}$ corresponds to a low pixel signal level, but not so well for higher signal levels (e.g., could cause increased noise in some situations). Moreover, the stored signals should not exceed the dynamic range of downstream circuitry (e.g., analog-to-digital converters), which could cause clipping. Accordingly, there exists a need and desire to increase intra-scene dynamic range and signal-to-noise ratio in imagers.

DETAILED DESCRIPTION

The signal-to-noise ratio (SNR) for an imager such as e.g., a CMOS imager, can be increased by applying gain in the analog readout channel that processes the output from the pixel circuits. In general, the amplification should be applied early in the readout channel and the gain should be maximized without causing signal clipping. The disclosed embodiments provide an imager architecture that can support pixel-wise automatic gain selection (AGS). That is, analog gain is applied (or not) on a per-pixel basis. The column circuitry samples either the pixel signal output directly (i.e., with unity or no gain) or after amplification (i.e., greater than unity gain) in a column level amplifier. In either situation, correlated double sampling (CDS) is achieved. In a disclosed embodiment, a comparator is used for making the decision to sample the pixel signal output directly or after amplification.

Figure 5:
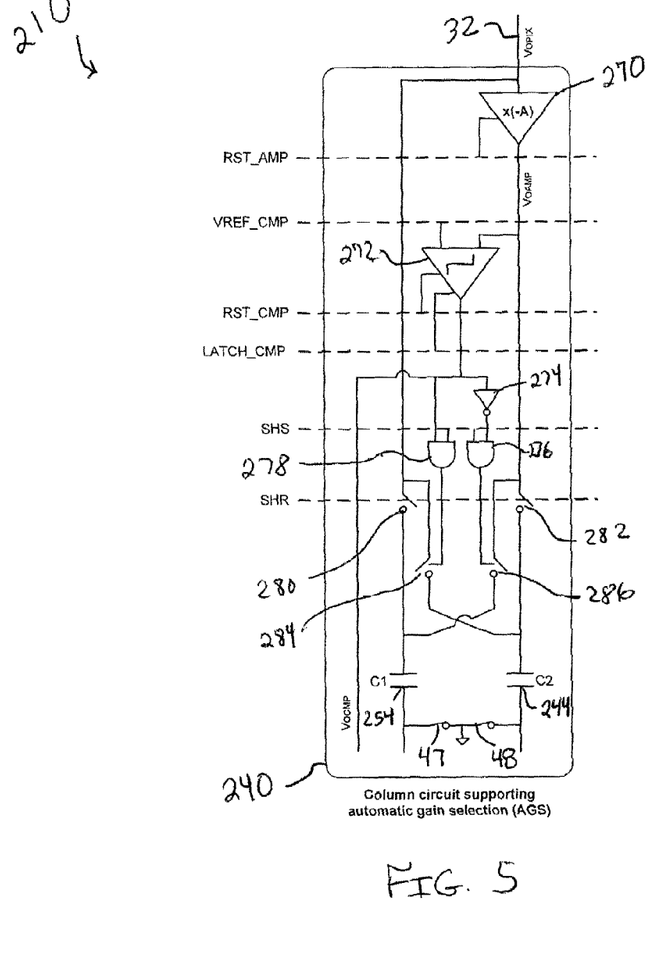
FIG. 5 illustrates a portion of an imager utilizing a column circuit supporting per-pixel automatic gain selection in accordance with an example embodiment.

Referring to the figures, where like reference numbers designate like elements, FIG. 5 illustrates a portion of an imager 210 utilizing a column circuit 240 supporting automatic gain selection (AGS) in accordance with an example embodiment. The column circuit 240 is connected to a column of pixels (e.g., pixel 20 of FIGS. 1 and 3) via a pixel output line 32. Although only one column circuit 240 is illustrated, it should be appreciated that if the imager 210 contained a plurality of pixel columns, then there would be an associated column circuit 240 for each column of pixels. Pixel output signals $V_{OPIX}$ (i.e., reset and pixel signal levels) are received over the pixel output line 32 in the manner described above. Although not shown, a constant current source can be used to provide a biasing current to bias the pixel output line 32, if desired.

The column circuit 240 includes a column level amplifier 270, shown as an inverting amplifier, comparator 272, an inverter 274, two AND gates 276, 278, two sample and hold reset signal switches 280, 282 (controlled by a sample and hold reset control signal SHR), two sample and hold pixel signal switches 284, 286 (controlled by the outputs of the AND gates 278, 276, respectively, when a sample and hold pixel control signal SHS is generated as explained below), a first capacitor 254 (having a first capacitance C1), a second capacitor 244 (having a second capacitance C2), and first and second clamping switches 47, 48. The amplifier 270 inputs the pixel output $V_{OPIX}$ (i.e., reset and pixel level signals) and has an amplifier output $V_{OAMP}$ based on the gain of the amplifier (e.g., −A). The amplifier 270 can be reset by a reset amplifier control signal RST_AMP. The amplifier output $V_{OAMP}$ is connected to one input of the comparator 272, one terminal of switch 282, and one terminal of switch 286.

The second input of the comparator 272 is connected to receive a comparator reference signal VREF_CMP. The comparator 272 can be reset by a reset comparator control signal RST_CMP. The output $V_{OCMP}$ of the comparator 272 is latched by a latch control signal LATCH_CMP. The output $V_{OCMP}$ of the comparator 272 is connected to a first input of the first AND gate 278 and the input of the inverter 274, and can also be output outside of the column circuit 240 to be used for e.g., digital gain compensation, if desired. The output of the inverter 274, which is the complement of the comparator output $V_{OCMP}$, is connected to the first input of the second AND gate 276. The second inputs of the two AND gates 278, 276 are connected to receive the sample and hold pixel control signal SHS.

The output of the first AND gate 278 is connected to control the first sample and hold pixel signal switch 284. The second terminal of the first sample and hold pixel signal switch 284 is connected to the first plate of the second capacitor 244. The output of the second AND gate 276 is connected to control the second sample and hold pixel signal switch 286. The second terminal of the second sample and hold pixel signal switch 286 is connected to the first plate of the first capacitor 254. The pixel output $V_{OPIX}$ (i.e., reset and pixel level signals) is connected to one terminal of the first sample and hold reset signal switch 280. The second terminal of the first capacitor 254 is connected to a clamping voltage vcl via the first clamping switch 47. The second terminal of the second capacitor 244 is connected to the clamping voltage vcl by the second clamping switch 48. As is known in the art, the clamping switches 47, 48 are controlled by a clamp signal (not shown) when it is desired to store signals on the capacitors 254, 244.

Figure 6:
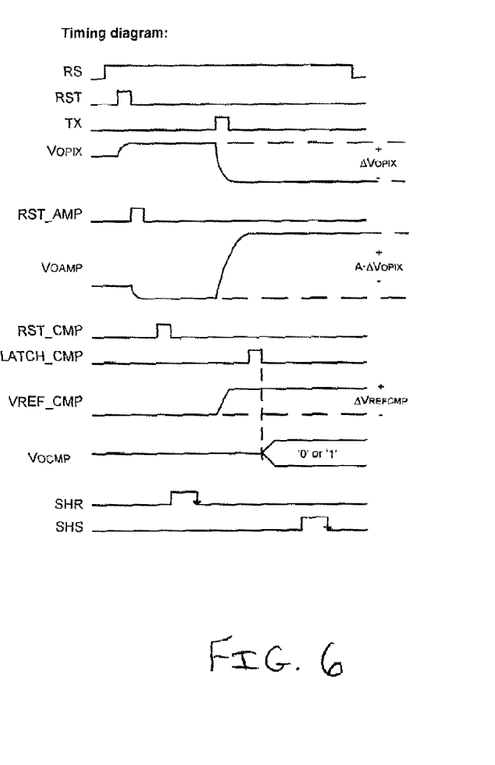
FIG. 6 illustrates a sample timing diagram of the operation of the FIG. 5 imager.
Figure 7:
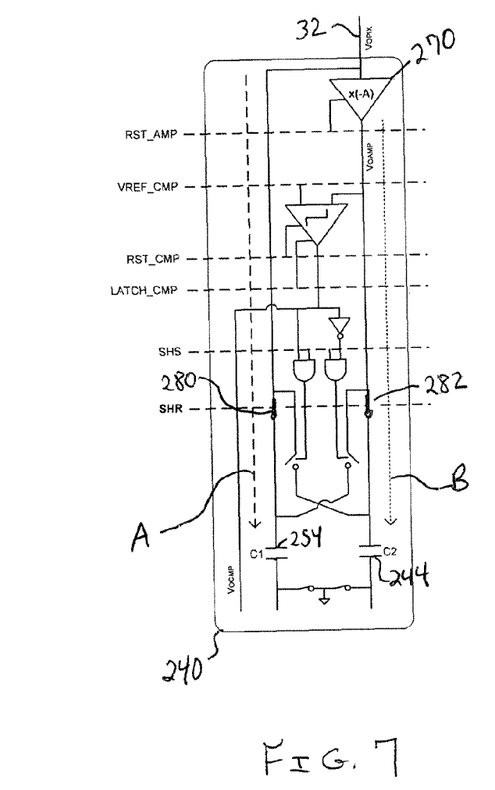
FIG. 7 illustrates the signal flow through the FIG. 5 imager for sampling reset level signals from a pixel circuit.

FIG. 6 illustrates a sample timing diagram of the operation of the FIG. 5 imager 210. The various control signals can be generated by timing and control circuitry (such as e.g., the circuitry 450 illustrated in FIG. 10 and discussed below). Referring to FIGS. 6-9, example operations of the imager 210 are now described. The row select control signal RS is set high to activate the row select transistor 30 (FIG. 1). The pixel readout operation is initiated when the reset control signal RST is pulsed, which activates the reset transistor 26 (FIG. 1) and resets the floating diffusion region FD (FIG. 1) to the array pixel supply voltage VAApix. The column level amplifier 270 is reset (by the pulsing of the reset amplifier control signal RST_AMP) after the floating diffusion region FD has been reset. The comparator 272 is reset with the pulsing of reset comparator control signal RST_CMP. This implies that the column amplifier 270 is reset relative to the pixel reset level and the comparator 272 relative to the reset level of the column amplifier 270. The reset levels from the pixel ($V_{OPIX}$) and column amplifier ($V_{OAMP}$) are sampled onto the first and second capacitors 254, 244, respectively, at the falling edge of the SHR pulse, which closes the sample and hold reset signal switch switches 280, 282 (as shown in FIG. 7). Arrow A of FIG. 7 illustrates the flow of the reset level from the pixel signal output $V_{OPIX}$ while arrow B illustrates the flow of the reset level from the amplifier 270 (i.e., $V_{OAMP\_RST}$).

Next, the transfer transistor control signal TX is pulsed to transfer any charge accumulated in the photosensor 22 (FIG. 1) to the floating diffusion region FD (FIG. 1). This will result in a voltage step on the floating diffusion region FD, where the size of the step depends on the conversion gain of the floating diffusion region FD. The voltage level of the pixel output signal $V_{OPIX}$ will change accordingly. When the charge transfer is complete, the transfer transistor control signal TX is de-asserted.

The comparator 272 inputs the column amplifier output $V_{OAMP}$ and detects if the output voltage swing exceeds a threshold defined by the change ($\Delta V_{REFCMP}$) in the comparator reference voltage VREF_CMP (as can be seen in the timing diagram, the comparator 272 was reset relative to VREF_CMP before $\Delta V_{REFCMP}$ was applied). When the output voltage $V_{OAMP}$ from the column amplifier 270 has settled, the comparator 272 is latched by pulsing the LATCH_CMP signal to freeze the comparator output $V_{OCMP}$ state. Then, either the amplifier output $V_{OAMP}$ or the original pixel signal output $V_{OPIX}$ is sampled as the pixel signal level based on the comparator output $V_{OCMP}$ in the manner described below.

Figure 8:
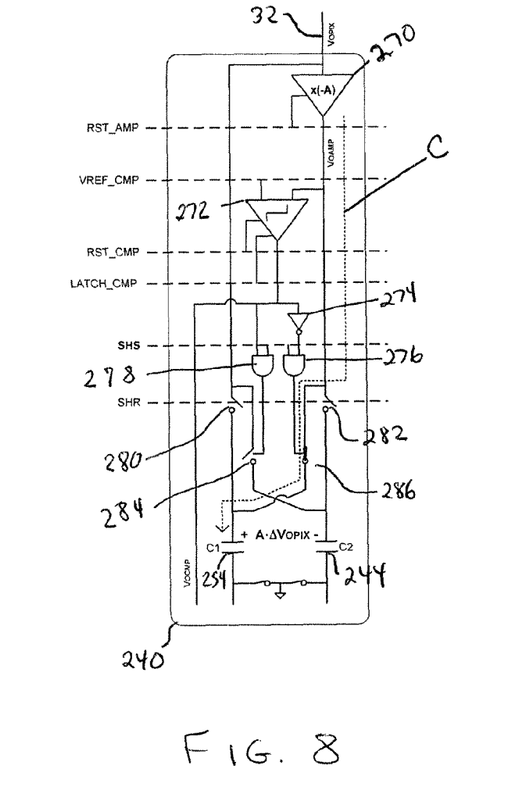
FIG. 8 illustrates the signal flow through the FIG. 5 imager for sampling an amplified pixel signal from a pixel circuit under a first condition.

In a first scenario, for low light conditions, the column amplifier output $V_{OAMP}$ is smaller than the comparator threshold $\Delta V_{REFCMP}$, causing the comparator output $V_{OCMP}$ to be '0'. This causes a '0' to be input at the first AND gate 278 and a '1' to be input at the second AND gate 276. When the sample and hold pixel control signal SHS is pulsed, a '0' is output from the first AND gate 278 and a '1' is output from the second AND gate 276. The '1' output from the second AND gate 276 closes sample and hold pixel signal switch 286 (sample and hold pixel signal switch 284 is open since the output from the first AND gate 278 is '0'). In this situation, the column amplifier output $V_{OAMP}$ is sampled on the first capacitor 254 at the falling edge of the sample and hold pixel control signal SHS pulse (as shown by arrow C in FIG. 8). The net voltage difference between the first and second capacitors 254, 244 equals $A \cdot \Delta V_{OPIX}$ (because the voltage gain of the amplifier 270 in this example is $-A$).

Figure 9:
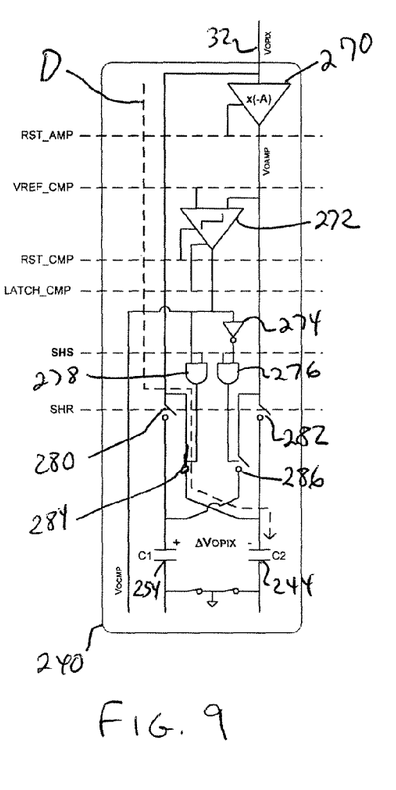
FIG. 9 illustrates the signal flow through the FIG. 5 imager for sampling a pixel signal from a pixel circuit under a second condition.

In a second scenario, for brighter light conditions, the column amplifier output $V_{OAMP}$ is larger than the comparator threshold $\Delta V_{REFCMP}$, causing the comparator output $V_{OCMP}$ to be '1'. This causes a '1' to be input at the first AND gate 278 and a '0' to be input at the second AND gate 276. When the sample and hold pixel control signal SHS is pulsed, a '1' is output from the first AND gate 278 and a '0' is output from the second AND gate 276. The '1' output from the first AND gate 278 closes sample and hold pixel signal switch 284 (sample and hold pixel signal switch 286 is open since the output from the second AND gate 276 is '0'). In this situation, the pixel output $V_{OPIX}$ is sampled on the second capacitor 244 at the falling edge of the sample and hold pixel control signal SHS pulse (as shown by arrow D in FIG. 9). The net voltage difference between the first and second capacitors 254, 244 equals $\Delta V_{OPIX}$.

The readout of the first and second sampling capacitors 254, 244 is done in a differential manner to achieve correlated double sampling. For further signal processing, the gain applied on a per-pixel basis at the column level in the column circuit 240 (in the analog domain) must be known (e.g., to perform digital multiplication by a factor 'A' for pixel values processed with analog unity gain (i.e., when $V_{OCMP}$ is '1' and $V_{OPIX}$ is sampled)). The comparator output $V_{OCMP}$ should be passed along with the signal level sampled onto the first and second sampling capacitors 254, 244. The comparator threshold used for gain selection in the column circuit 240 could in principle match the dynamic range for the readout channel after column sampling. However, since the trip point for the comparator 272 will be affected by noise, the comparator threshold $\Delta V_{REFCMP}$ should be set slightly lower than the theoretical limit to provide some headroom and to avoid signal clipping induced by noise. It is desirable that the column amplifier output $V_{OAMP}$ is not sampled onto the sampling capacitors 254, 244 when the output $V_{OAMP}$ exceeds the dynamic range for the readout channel after column sampling because that would introduce non-linearity in the transfer characteristic (saturation should only occur at unity gain).

As can be seen, the illustrated embodiment achieves true correlated double sampling in combination with pixel-wise automatic gain selection. When sampling the pixel signal level, the column circuit 240 will automatically select one of two possible gain settings, unity gain (1) or a gain greater than unity (e.g., A). Either the pixel output $V_{OPIX}$ or column level amplifier output $V_{OAMP}$ is sampled onto the column sampling capacitors 254, 244 based on the situation (e.g., lighting conditions as represented by the pixel output $V_{OPIX}$). A column level comparator 272 is used to detect whether to sample the pixel output directly (i.e., $V_{OPIX}$) or after amplification (i.e., $V_{OAMP}$) in a simple and efficient manner.

One minor side effect of the proposed scheme is that any common mode noise that is sampled onto the bottom plates of the sampling capacitors 244, 254 (the SHR/SHS sampling switches 280, 282, 284, 286 being connected to the capacitor top plates) will have the opposite sign depending on whether the pixel output is sampled directly (i.e., $V_{OPIX}$ is sampled) or after amplification (i.e., $V_{OAMP}$ is sampled). This is not a problem, but should be taken into account for system level design (e.g., for row-wise correction scheme).

Figure 10:
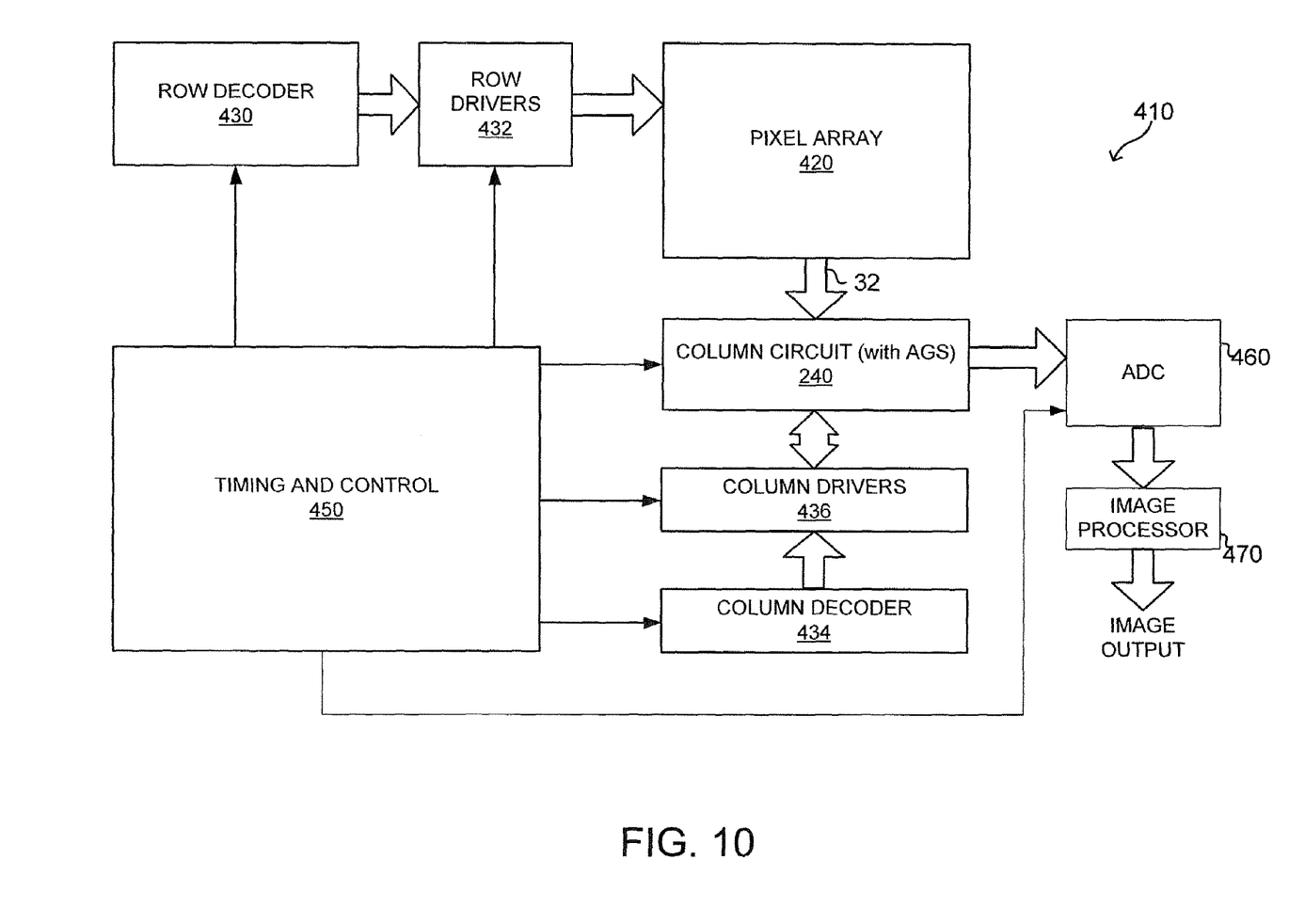
FIG. 10 shows an imager incorporating the imager portion illustrated in FIG. 5.

FIG. 10 shows an imager 410 incorporating the imager portion illustrated in FIG. 5. Specifically, the imager includes a pixel array 420 (comprising pixels 20 illustrated in FIG. 1) connected to a column circuit 240 that supports per-pixel automatic gain selection (AGS). The pixel array 420 comprises a plurality of pixels arranged in a predetermined number of columns and rows. The pixels of each row in the array 420 are all turned on at the same time by a row select line and the pixel signals of each column are selectively output onto output lines 32 by a column select line. A plurality of row and column select lines are provided for the entire array 420.

The row lines are selectively activated by the row driver 432 in response to row address decoder 430 and the column select lines are selectively activated by the column driver 436 in response to column address decoder 434. Thus, a row and column address is provided for each pixel. The CMOS imager 410 is operated by the control circuit 450, which controls the address decoders 430, 434 for selecting the appropriate row and column select lines for pixel readout, and row and the column driver circuitry 432, 436, which apply driving voltage to the drive transistors of the selected row and column select lines. As mentioned above, the timing and control circuit 450 can generate the control signals required to operate the pixel circuitry 20 and the column circuit 240.

Each column contains a column circuit 240 (described above) associated with the column driver 436. A differential signal resulting from correlated double sampling (described above) is produced for each pixel and is digitized by an analog-to-digital converter 460 (ADC). The analog-to-digital converter 460 supplies the digitized pixel signals to an image processor 470, which processes the digital data and forms a digital image output.

Figure 11:
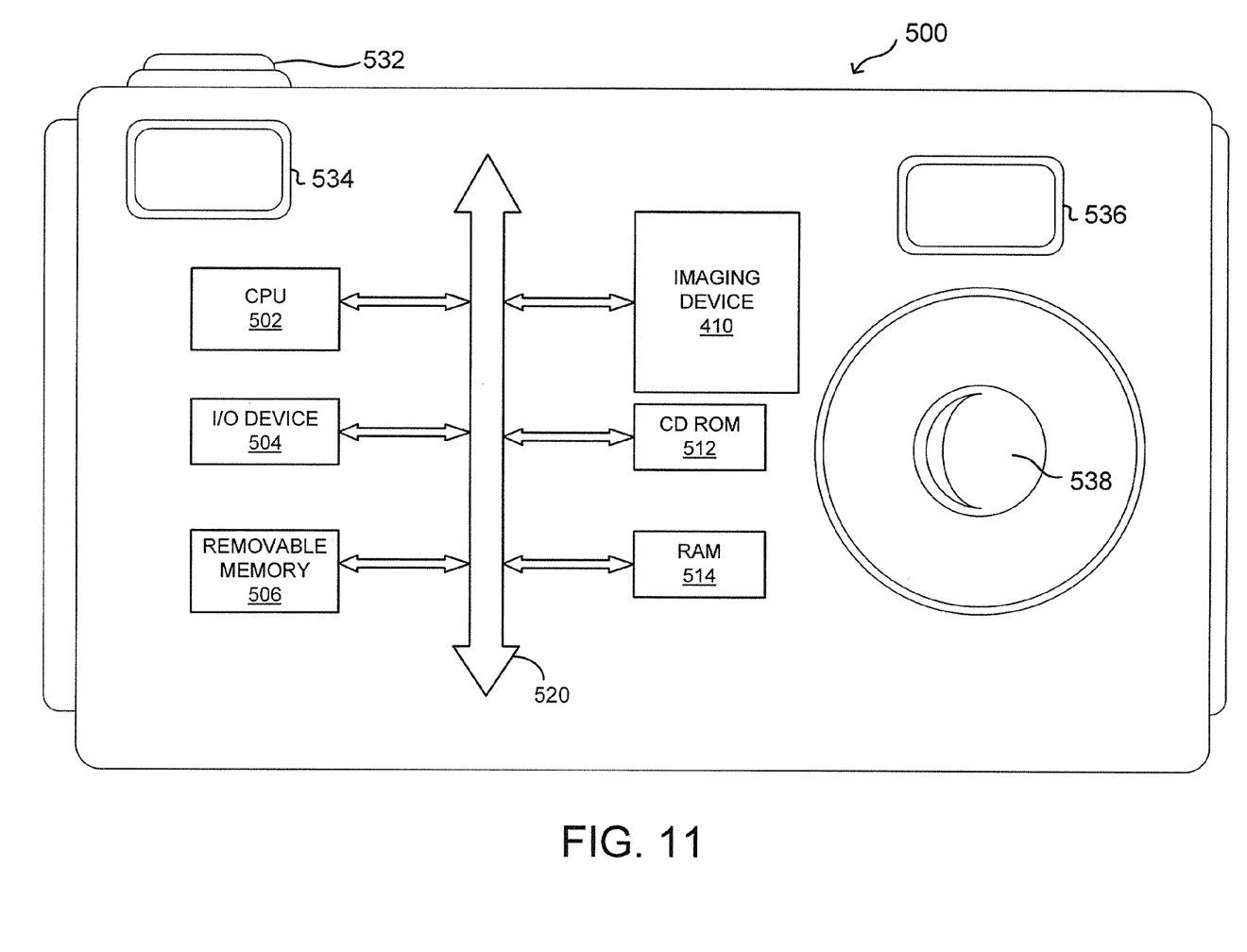
FIG. 11 shows a processor system incorporating at least one imaging device constructed in accordance with an embodiment disclosed herein.

FIG. 11 shows a processor system 500 incorporating at least one imager 410 constructed and operated in accordance with an embodiment disclosed herein. The system 500 could, for example be a camera system comprising a shutter release button 532, a view finder 534, a flash 536 and a lens system 538 for focusing an image on the pixel array of the imaging device 410. The system 500 generally also comprises a central processing unit (CPU) 502, for example, a microprocessor for controlling functions and which communicates with one or more input/output devices (I/O) 504 over a bus 520. The CPU 502 also exchanges data with random access memory (RAM) 514 over the bus 520, typically through a memory controller. The camera system may also include peripheral devices such as a removable memory 506, which also communicates with CPU 502 over the bus 520. In the case of a computer system, the system 500 could also include a CD ROM drive 512. Other processor systems which may employ imaging devices 410 besides cameras, include computers, personal digital assistants (PDAs), cellular telephones, scanners, machine vision systems, and other systems requiring imaging applications.

The above description and drawings illustrate various embodiments It should be appreciated that modifications, though presently unforeseeable, of these embodiments that can be made without departing from the spirit and scope of the invention which is defined by the following claims.

What is claimed as new and desired to be protected by Letters Patent of the United States is:

1. An imager comprising:
   a pixel array organized into a plurality of rows and columns; and
   a plurality of column circuits, each column circuit being associated with and connected to a respective column of the array, each column circuit receiving reset and pixel level signals from its associated column and selectively applying pixel level signal gain to one or more of the received pixel level signals, wherein each column circuit selectively applies a unity gain to the received pixel level signal when the received pixel level signal is below a predetermined threshold.

2. An imager comprising:
   a pixel array organized into a plurality of rows and columns; and
   a plurality of column circuits, each column circuit being associated with and connected to a respective column of the array, each column circuit receiving reset and pixel level signals from its associated column and selectively applying pixel level signal gain to one or more of the received pixel level signals, wherein each column circuit comprises:
      an amplifier connected to receive the reset and pixel level signals from the associated column, said amplifier having a first amplifier output corresponding to an amplifier reset level of said amplifier and a second amplifier output corresponding to an amplified pixel level signal; and
      a decision circuit connected to receive the second amplifier output and to determine whether the pixel level signal or the second amplifier output should be stored based on a value of the second amplifier output.

3. The imager of claim 2, wherein the decision circuit comprises a comparator configured to compare the second amplifier output to a reference level.

4. The imager of claim 2, wherein each column circuit further comprises:
   first and second storage elements;
   reset signal selection circuitry controllable to store the reset level signal in the first storage element and the first amplifier output in the second storage element in response to a first sample and hold control signal; and
   pixel signal selection circuitry controllable to store the second amplifier output in the first storage element or the pixel level signal in the second storage element in response to a second sample and hold control signal and an output of the decision circuit.

5. The imager of claim 4, wherein the signals stored at the first and second storage elements are used to create a correlated double sampled output.

6. The imager of claim 4, wherein the signals stored at the first and second storage elements are used to create a correlated double sampled output and the output of the decision circuit is used for digital processing of the correlated double sampled output.

7. An imager comprising:
   a pixel array organized into a plurality of rows and columns; and
   a plurality of column circuits, each column circuit comprising:
      first and second storage elements,
      an amplifier connected to receive reset and pixel level signals from an associated column, said amplifier having a first amplifier output corresponding to an amplifier reset level of said amplifier and a second amplifier output corresponding to an amplified pixel level signal, a decision circuit connected to receive the second amplifier output, compare the second amplifier output to a threshold, and generate an output having a first value indicating that the pixel level signal should be stored or a second value indicating that the second amplifier output should be stored, reset signal selection circuitry controllable to store the reset level signal in the first storage element and the first amplifier output in the second storage element in response to a first sample and hold control signal, and pixel signal selection circuitry controllable to store the second amplifier output in the first storage element or the pixel level signal in the second storage element in response to a second sample and hold control signal and the output of the decision circuit.

8. The imager of claim 7, wherein the decision circuit comprises a comparator.

9. The imager of claim 7, wherein the signals stored at the first and second storage elements are used to create a correlated double sampled output.

10. The imager of claim 7, wherein the signals stored at the first and second storage elements are used to create a correlated double sampled output and the output of the decision circuit is used for digital processing of the correlated double sampled output.

11. A camera system comprising:
a lens structure; and
an imager, said imager comprising:
a pixel array organized into a plurality of rows and columns, said pixel array receiving light corresponding to an input image through the lens structure, and
a plurality of column circuits, each column circuit being associated with and connected to a respective column of the array, each column circuit inputting reset and pixel level signals from its associated column and being controllable to perform per-pixel automatic gain selection on the pixel level signals, wherein each column circuit is controllable to apply a unity gain to an input pixel level signal prior to storing the pixel level signal when the pixel level signal is below a predetermined threshold.

12. A camera system comprising:
a lens structure; and
an imager, said imager comprising:
a pixel array organized into a plurality of rows and columns, said pixel array receiving light corresponding to an input image through the lens structure, and
a plurality of column circuits, each column circuit being associated with and connected to a respective column of the array, each column circuit inputting reset and pixel level signals from its associated column and being controllable to perform per-pixel automatic gain selection on the pixel level signals, wherein each column circuit comprises:
an amplifier connected to receive the reset and pixel level signals from the associated column, said amplifier having a first amplifier output corresponding to an amplifier reset level of said amplifier and a second amplifier output corresponding to an amplified pixel level signal, and a decision circuit connected to receive the second amplifier output and to determine whether the pixel level signal or the second amplifier output should be stored based on a value of the second amplifier output.

13. The system of claim 12, wherein the decision circuit comprises a comparator configured to compare the second amplifier output to a reference level.

14. The system of claim 12, wherein each column circuit further comprises:
first and second storage elements;
reset signal selection circuitry controllable to store the reset level signal in the first storage element and the first amplifier output in the second storage element in response to a first sample and hold control signal; and
pixel signal selection circuitry controllable to store the second amplifier output in the first storage element or the pixel level signal in the second storage element in response to a second sample and hold control signal and an output of the decision circuit.

15. A method of operating a column circuit of an imager, said method comprising:
receiving a reset signal from a pixel column associated with the column circuit;
resetting an amplifier to create an amplifier reset level signal;
storing the received reset signal in a first storage element;
storing the amplifier reset level signal in a second storage element;
receiving a pixel signal from the pixel column;
amplifying the pixel signal to create an amplified pixel signal; and
determining whether the pixel signal or the amplified pixel signal should be stored in one of the first and second storage elements based on a value of the amplified pixel signal.

16. The method of claim 15, wherein the determining step comprises comparing the amplified pixel signal to a predetermined threshold.

17. The method of claim 16 wherein the amplified pixel signal is stored in the first storage element when the amplified pixel signal is less than the predetermined threshold.

18. The method of claim 16, wherein the pixel signal is stored in the second storage element when the amplified pixel signal is greater than or equal to the predetermined threshold.

19. The method of claim 15 further comprising the acts of:
storing the amplified pixel signal in the first storage element when it is determined that the amplified pixel signal is less than the predetermined threshold; and
outputting a correlated double sampled output from the first and second storage elements.

20. The method of claim 15 further comprising the acts of:
storing the pixel signal in the second storage element when it is determined that the amplified pixel signal is greater than or equal to the predetermined threshold; and
outputting a correlated double sampled output from the first and second storage elements.

* * * * *